(12) United States Patent
Li et al.

(10) Patent No.: US 6,459,902 B1
(45) Date of Patent: Oct. 1, 2002

(54) SYSTEM AND METHOD FOR SELECTIVELY BLOCKING OR DROPPING CALLS IN A TELECOMMUNICATIONS NETWORK

(75) Inventors: Peng Li; Sanjay Singhal, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/392,437

(22) Filed: Sep. 7, 1999

(51) Int. Cl.[7] .......................... H04Q 7/20; H04M 11/00; H04B 1/06
(52) U.S. Cl. ..................... 455/453; 455/405; 455/445; 455/26.1; 379/112.03; 379/112.1; 379/133
(58) Field of Search ................................. 455/445, 26.1, 455/405, 408, 434, 426, 450–453, 509; 379/111, 112, 133, 134, 112.03, 112.1

(56) References Cited

U.S. PATENT DOCUMENTS

| | | | |
|---|---|---|---|
| 5,067,074 A | | 11/1991 | Farel et al. .................. 709/235 |
| 5,245,629 A | | 9/1993 | Hall ........................... 375/130 |
| 5,295,183 A | * | 3/1994 | Langlois et al. ............. 379/113 |
| 5,488,609 A | | 1/1996 | Hluchyj et al. .............. 370/232 |
| 5,666,356 A | * | 9/1997 | Fleming et al. .............. 455/453 |
| 5,881,137 A | * | 3/1999 | Ginzboorg et al. ......... 379/134 |

FOREIGN PATENT DOCUMENTS

| | | |
|---|---|---|
| EP | 0750440 | 12/1996 |
| GB | 2334175 | 8/1999 |
| WO | 9514341 | 5/1995 |

OTHER PUBLICATIONS

P. Ginzboorg: "Methods to Synchronize the SCP's Overload Protection Mechanism," Proceedings of the IFIP TC6 Conference on Intelligent Networks and New Technologies, Lyngby, Denmark, Aug. 30–31, 1995, 1996. (pp. 155–174).

* cited by examiner

Primary Examiner—Vivian Chin
Assistant Examiner—Eliseo Ramos-Feliciano
(74) Attorney, Agent, or Firm—Philip R. Wadsworth; Kent D. Baker; Thomas R. Rouse

(57) ABSTRACT

A system for selectively blocking or dropping calls in a telecommunications network. The system includes a first mechanism that monitors usage of the telecommunications network and provides a gauging signal in response thereto when the network usage exceeds a predetermined threshold. A second mechanism determines a percentage of calls to block by the network in response to the gauging signal. The percentage of calls to block corresponds to a desired number of blocked calls out of a certain number of calls. A third mechanism automatically blocks the percentage of calls out of the certain number of calls. In a specific embodiment, the third mechanism includes an additional mechanism that accounts for values of the percentage that do not evenly divide into the certain number of calls. The additional mechanism includes another mechanism that accounts for a remainder resulting from a division of the certain number of calls by the desired number of calls to be blocked. The additional mechanism divides the certain number of calls by the desired number of calls and provides a number of calls to skip and a remainder in response thereto. The number of calls to skip is equivalent to one less than the quotient resulting from the division of the certain number of calls by the desired number of calls.

17 Claims, 3 Drawing Sheets

SYSTEM AND METHOD FOR SELECTIVELY BLOCKING OR DROPPING CALLS IN A TELECOMMUNICATIONS NETWORK

BACKGROUND OF THE INVENTION

I. Field of Invention

This invention relates to telecommunications systems. Specifically, the present invention relates to systems and methods for selectively blocking calls to alleviate or prevent overload conditions in telecommunications networks.

II. Description of the Related Art

Telecommunications networks are employed in a variety of demanding applications including Internet, faxing, wireless communications, and other applications. As demand for such applications increases, telecommunications networks must adjust to increased traffic by implementing systems and methods to account for the additional traffic and to prevent network overload.

Wireless telecommunications networks are particularly vulnerable to network overload. A wireless network becomes overloaded when the number of calls routed through the network becomes sufficiently large to significantly degrade the performance of the network. The exact parameters for determining when a network is overloaded vary from system to system.

Wireless telecommunications systems are often characterized by a plurality of mobile stations (e.g. wireless telephones, mobile units, wireless telephones, or mobile phones) in communication with one or more base station transceiver subsystems (BTSs) or gateway radio frequency systems (GRSs). Signals transmitted by the mobile stations are received by a BTS and often relay to a mobile switching center (MSC) or gateway switching system (GSS). The MSC or GSS, in turn, routes the signal to a public switched telephone network (PSTN) or to another mobile station. Similarly, a signal may be transmitted from the PSTN to a mobile station via a base station and/or BTS and an MSC.

Systems for blocking calls routed from the PSTN to the wireless network are often employed to prevent or alleviate network overload conditions. For example, in one call-blocking system, when the network becomes overloaded, all outgoing calls are withheld for a certain time interval. Unfortunately, existing call-blocking systems typically do not precisely block a certain percentage of calls over a given number of calls, and do not automatically evenly block incoming calls over a given number of incoming calls. For example, if a system must evenly block 23% of the next 1000 incoming calls to effectively alleviate a network overload condition, existing systems will not precisely block 23% of the next 1000 incoming calls, and furthermore, will not evenly distribute the blocked calls over the 1000 incoming calls. Uneven call-blocking distributions may result in undesirable network load inefficiencies and call-blocking inaccuracies, as to many or too few calls may be blocked at inappropriate times.

Hence, a need exists in the art for a system and method for accurately and selectively blocking a predetermined percentage of calls in a telecommunications network. There exists a further need for a call blocking system that accurately determines percentage of calls to block over a given number of calls and evenly distributes the blocked calls even when the call blocking percentage changes.

SUMMARY OF THE INVENTION

The need in the art is addressed by the system for selectively blocking or dropping calls in a telecommunications network of the present invention. In the illustrative embodiment, the inventive system is adapted for use with a wireless telecommunications network. The system includes a first mechanism for monitoring network usage and providing a gauging signal in response thereto when the network usage exceeds a predetermined threshold. A second mechanism determines a percentage of calls to block by the network in response to the gauging signal. The percentage of calls to block corresponds to a desired number of blocked calls out of a certain number of calls. A third mechanism automatically blocks the percentage of calls out of the certain number of calls.

In a specific embodiment, the third mechanism includes a mechanism for accounting for a remainder resulting from a division of the certain number of calls by the desired number of calls. An additional mechanism accounts for values of the desired number of blocked calls that do not evenly divide into the certain number of calls. The mechanism for accounting further includes a mechanism for dividing the certain number of calls by the desired number of calls and providing a number of calls to skip and a remainder in response thereto. The number of calls to skip is equivalent to one less than the quotient resulting from the division of the certain number of calls by the desired number of calls to be blocked.

In a more specific embodiment, the mechanism for accounting also includes mechanism for blocking a subsequent call after skipping the number of calls to skip. Another mechanism employs the remainder to adjust the number of calls to skip so that over the certain number of calls, the number of blocked calls are blocked by the mechanism for blocking.

In the illustrative embodiment, the second mechanism includes a controller running on a gateway switching system. The third mechanism further includes a mechanism for determining a throttle rate based on the percentage of calls to block. An initializing mechanism initializes an initial fraction rate to the remainder of the certain number of calls divided by the throttle rate and initializes a fraction rate to zero. The initializing mechanism also initializes a skip count to one or, if previously initialized, to a previous value of Skip Count plus the difference between the throttle rate and a previous value for the throttle rate.

The third mechanism further includes a processing mechanism that processes incoming calls to determine calls to block by the third mechanism. The processing mechanism selectively decrements the skip count each time a call is processed and increments the fraction rate by the initial fraction rate. The processing mechanism also re-initializes the skip count to the throttle rate plus one and sets the fraction rate equal to the fraction rate minus the desired number of blocked calls each time the fraction rate becomes larger than the desired number of calls to be blocked. The processing mechanism initiates blocking of an incoming call each time the skip count becomes less than or equal to zero.

The novel design of the present invention is facilitated by the third mechanism, which automatically blocks a specific percentage of calls out of a given number of calls, thereby preventing or alleviating a network overload condition. The efficiency of the present invention is enhanced by the fact that the third mechanism evenly distributes dropped calls over a given number of calls while simultaneously accounting for changes in values of the percentage of calls to block.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
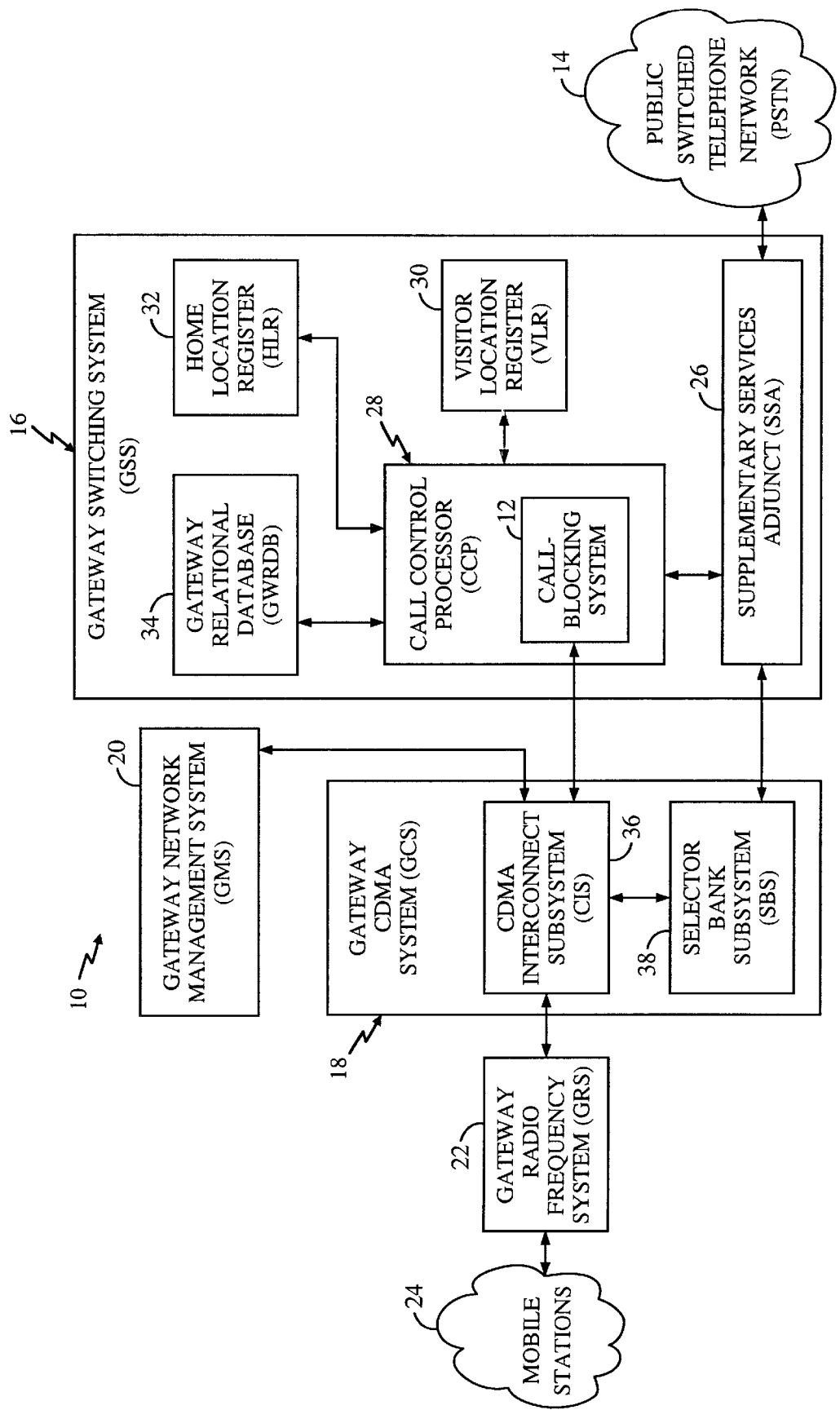
FIG. 1 is a diagram of a communications system constructed in accordance with the teachings of the present invention and including the call blocking system of the present invention.

FIG. 1 is a diagram of an exemplary communications system 10 constructed in accordance with the teachings of the present invention and including a call blocking system 12 of the present invention. For clarity, various components, such as TFUs (timing and frequency units), SS7 servers, and routers, have been omitted from FIG. 1, however those skilled in the art will know where and how to implement the additional requisite components.

The communications system 10 includes a public switched telephone network (PSTN) 14 in communication with a gateway switching system (GSS) 16. The GSS 16 is connected to a gateway code division multiple access system (GCS) 18, which is connected to and managed by a gateway network management system (GMS) 20. The GCS 18 is connected to a gateway radio frequency system (GRS) 22, which is in communication with mobile stations 24. The mobile stations 24 are wireless phones or wireless data modems.

The GSS 16 includes a supplementary services adjunct (SSA) 26, a call control processor (CAP) 28 having the call-blocking system 12, a visitor location register (VLR) 30, a home location register (HLR) 32, and a gateway relational database (GWRDB) 34. The GCS 18 includes a code division multiple access interconnect subsystem (CIS) 36 and a selector bank subsystem (SBS) 38.

The SSA 26 is connected to the PSTN 14, the CCP 28, and the SBS 38 of the GCS 18. The CCP 28 is connected to the SSA 26, the CIS 36 of the GCS 18, the VLR 30, the HLR 32, and the GWRDB 34. The CIS 36 and the SBS 38 of the GCS 18 are interconnected. The CIS 36 is connected to the GRS 22.

When a call originates from the landline network, i.e., the PSTN 14, it first passes to the SSA 26. The SSA 26 acts as a switch to facilitate the routing of calls between the PSTN 14 and the GSS 16. The GSS 16 is often called a mobile switching center (MSC).

Network resources assigned to SSA 26 and the switching behavior of the SSA 26 are controlled by the CCP 28. The CCP 28 includes several processors, as discussed more fully below, which run various types of software and/or hardware algorithms to control the SSA 26, and the call resources employed thereby. The CCP 28 also controls call setup and tear-down and maintains call billing data. In addition, the CCP 28 controls the allocation and de-allocation of SBS selector resources employed by the SBS 38, service resources, and radio link resources. SSAs, such as the SSA 26, are known in the art, and one skilled in the art can order an SSA or modify an existing SSA to meet the needs of the present invention.

Once the land-originated call from the PSTN 14 arrives at the SSA 26, a sequence of messages is transferred between the SSA 26 and the CCP 28 that determine call resources to be assigned to the SSA 26. If the network 10 is overloaded or may soon become overloaded, the call blocking system 12 may drop the incoming land-originated call. The call-blocking system 12 selectively drops certain incoming calls from the PSTN 14 in accordance with call-blocking software running on the call-blocking system 12 as discussed more fully below.

To drop a call, the call-blocking system 12 issues a message or a sequence of messages to the SSA 26 instructing the SSA 26 to not provide resources to the call and to play a busy tone or otherwise indicate to the calling party that the call cannot be completed. Those skilled in the art will appreciate that the busy tone or the indication that the call cannot be completed may be omitted without departing from the scope of the present invention.

If the incoming land-originated call is not blocked, the CCP 28 sets up the call, allocates call resources, and connects the appropriate PSTN channel to a channel of the SBS 38 via the SSA 26. In addition, software running on the CCP 28 and associated registers 30 and 32 and the GWRDB 34 tracks the call and maintains call detail information for billing and caller authentication purposes.

The HLR 32 is a database that maintains mobile station identification numbers and corresponding billing information for mobile stations 24 operating within their home coverage area. The VLR 30 retrieves subscriber authentication and registration from the HLR 32 and maintains a local record of subscriber information for the mobile stations 24. Identification and billing information for users of mobile stations 24 roaming within the coverage area of the system 10 is stored in files within the VLR 30 and selectively accessed by the CCP 28. Additional database functionality is provided by the GWRDB 34, the operation and construction of which is known in the art.

With access to the present teachings, one skilled in the art may adapt an existing CCP to implement the CCP 28 of the present invention. HLRs, VLRs, and GWRDBs, such as the VLR 30, the HLR 32, and the GWRDB 34, are known in the art.

The CCP 28 allocates appropriate call resources to the SSA 26 and connects the PSTN channel associated with the incoming land-originated call to the appropriate SBS channel. When the incoming land-originated call is transferred from the SSA 26 to the SBS 38 and requisite call resources are allocated to the SBS 38, the call is transferred to the CIS 36.

The CIS 36 helps prepare mobile-originated calls for transmission over the PSTN 14 and helps prepare land-originated calls for wireless transmission via the GRS 22. The GMS 20 performs network management functions such as system configuration, initialization and resource management. The CIS 36 may be further controlled by the CCP 28 via control signals from the CCP 28.

GMSs, GRSs, and GCSs such as the GMS 20, the GRS 22, and the GCS 18, respectively, are known in the art. The GCS 18 may be implemented as a base station controller, and the GRS 22 may be implemented as a base station transceiver subsystem without departing from the scope of the present invention.

The GCS 18 facilitates the conversion of analog signals from the PSTN 14 via the GSS 16 into code division multiple access (CDMA) spread spectrum signals in preparation for wireless transmission via the GRS 22. The GCS 18 also facilitates the conversion of digital CDMA spread spectrum signals received from the mobile stations 24 via the GRS 22 into analog signals in preparation for transmission over the PSTN 14.

When a call is originated from one of the mobile stations 24, the call connects to GRS 22, which performs requisite frequency conversions, noise filtering, and signal amplifying. The GRS 22 transfers the call to the GCS 18 where the call is assigned certain network resources, monitored, and prepared for transmission over the PSTN 14. The mobile-originated call is transferred from the GRS 22 to the CIS 36, then to the SBS 38, and subsequently to the SSA 26 and to the PSTN 14, where it is connected to the called party if available.

In the present specific embodiment, the call-blocking system 12 selectively blocks or drops land-originated calls, however those skilled in the art will appreciate that the call-blocking system 12 may be adapted to drop mobile-originated calls without departing from the scope of the present invention.

A land-originated call from the PSTN 14 is sent the SSA 26, which then notifies the call blocking system 12 of the incoming call. An NSS of the call-blocking system, as discussed more fully below, runs call-blocking software that monitors a network status variable (throttle value (n/m)) and determines, based on the variable, if the call should be blocked. The network status variable is based on CPU utilization of processors within the CCP 28, the number of outstanding pages, and the arrival rate of land-originated calls, as discussed more fully below.

Figure 2:
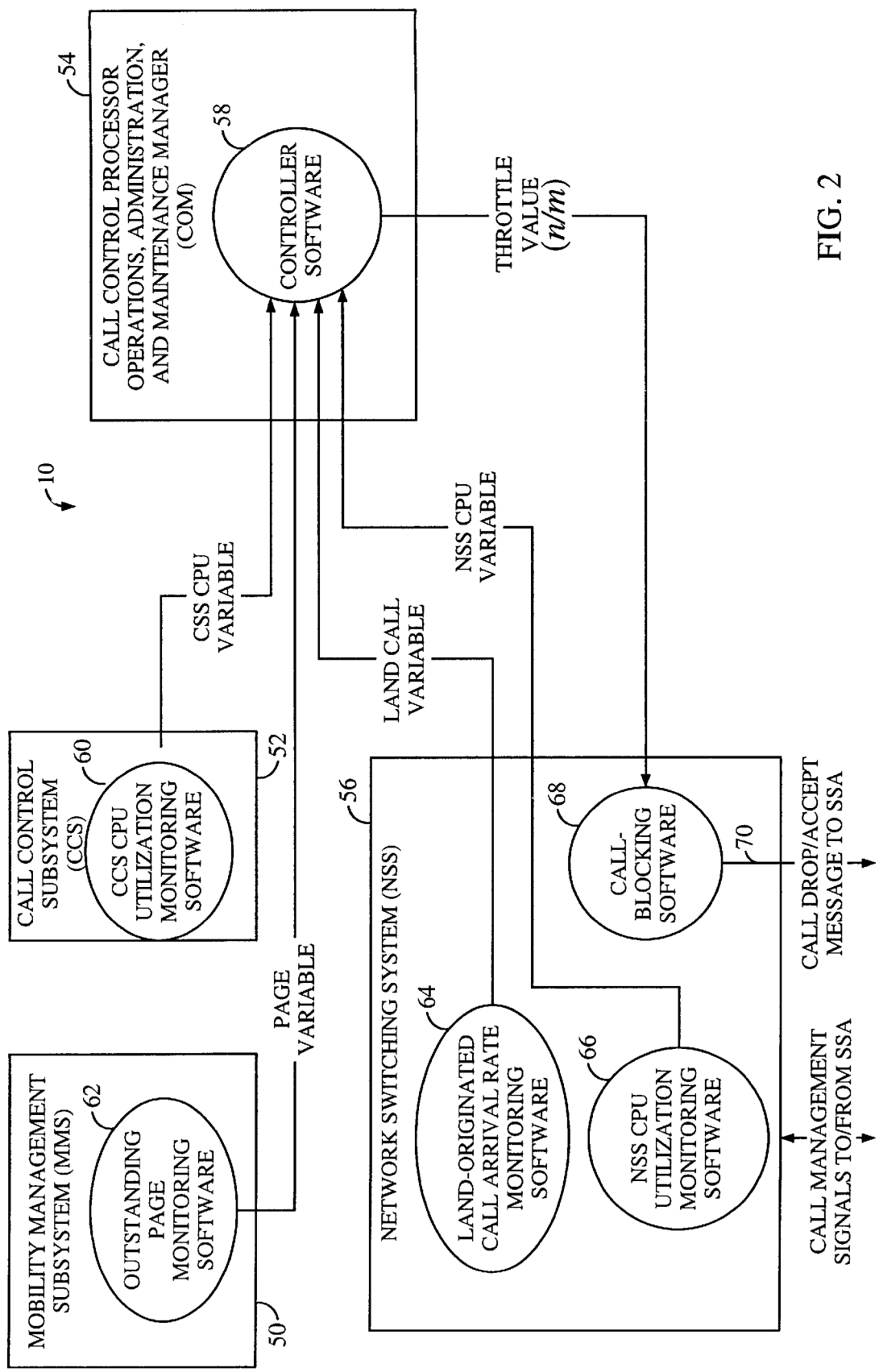
FIG. 2 is a more detailed diagram of the call-blocking system of the present invention showing key functional blocks of the call control processor (CCP) of FIG. 1 employed by the call-blocking system of the present invention.

FIG. 2 is a mere detailed diagram of the call-blocking system 12 of the present invention showing key functional blocks of the CCP 28 of FIG. 1 employed by the call-blocking system 12 of the present invention. The call-blocking system 12 employs a mobility management subsystem (MMS) 50, a call control subsystem (CSS) 52, a call control processor operations, administration, and maintenance manager (COM) 54, and a network switching system (NSS) 56.

The general network functions of and corresponding CCP network software running on the NSS 56, the MMS 50, the CCS 52, and the COM 54 are known in the art. For clarity, the CCP network software has been omitted from FIG. 12. The MMS 50, the CCS 52, the COM 54, and the NSS 56 represent different processors of the CCP 28 of FIG. 1, which run, in addition to standard CCP network software mentioned above, software for implementing the call-blocking system of the present invention, as discussed more fully below.

The COM 54 runs controller software 58 that receives input from CCS central processing unit (CPU) utilization monitoring software 60 running on the CCS 52, outstanding page monitoring software 62 running on the MMS 50, land-originated call arrival rate monitoring software 64 running on the NSS 56, NSS CPU utilization monitoring software 66 running on the NSS 56, and call-blocking software 68 also running on the NSS 56.

For the purposes of the present discussion, the terms drop, throttle, and block are employed interchangeably to mean ignore the incoming call by not connecting the incoming call with dialed party and preventing the call from employing minimum network resources to reduce system load condition.

In operation, the CCS CPU utilization monitoring software 60 monitors the usage of the CPU of the CCS 52 and provides a CCS CPU variable in response thereto to the controller software 58. Algorithms for measuring CPU utilization are known in the art and may be easily adapted to implement the software 60 and 66 of the present invention.

The outstanding page monitoring software 62 determines the current number of outstanding pages and provides a page variable, representative of the outstanding pages, to the controller software 58. With access to the present teachings, those ordinarily skilled in the art may construct the software 62 without undue experimentation.

The land-originated call arrival rate monitoring software 64 monitors the arrival rate of incoming calls from the PSTN 14 of FIG. 1, which provides a land call variable indicative of the land-originated incoming call arrival rate to the controller software 58 in response thereto. Software for monitoring the arrival rate of incoming calls may be easily constructed by one skilled in the art with access to the present teachings.

The NSS CPU utilization monitoring software 66 monitors the usage of the CPU of the NSS 56 and provides an NSS CPU variable to the controller software 58 in response thereto. The NSS CPU variable provides an indication of the NSS 56 processor load.

The controller software 58 receives the CCS CPU variable, the page variable, the land call variable, and the NSS CPU variable from the software 60, 62, 64, and 66, respectively and weights each variable in accordance with a predetermined scheme. The predetermined weighting scheme is application-specific and may be determined by one skilled in the art to meet the needs of a given application. The weighted variables are then averaged to yield a network status variable. The network status variable is compared to a predetermined threshold to determine if some incoming calls should be selectively blocked to prevent or alleviate a network overload condition. The predetermined threshold is also application-specific and easily determined by one skilled in the art to meet the needs of a given application. If the network status variable exceeds the predetermined threshold, then a desired percentage of calls to block is established based on the network status variable. In the present specific embodiment, the percentage is expressed as a desired number of calls (m) to evenly drop or block over (n) calls and is called the throttle value (n/m). The exact of the equation. or method for computing n and in based on the network status variable is also application-specific.

The throttle variable is then provided to the call-blocking software 68 by controller software 58. The call-blocking software 68 determines when to block or drop an incoming call to accurately block or drop m calls out of n calls received from the PSTN 14. An accept/reject message is then provided to the SSA 26 of FIG. 1 directing the SSA 26 to either accept or drop the incoming call. If the incoming call should be dropped as indicated by the accept/reject message, then the SSA 26 may connect the incoming call to a busy signal or to a message playback system or may just drop the call depending on the given application. The inventive call-blocking software 68 of the present invention is discussed more fully below.

Those skilled in the art will appreciate that the software elements depicted at 58, 60, 62, 64, 66, and 68 may be implemented in hardware without departing from the scope of the present invention.

Figure 3:
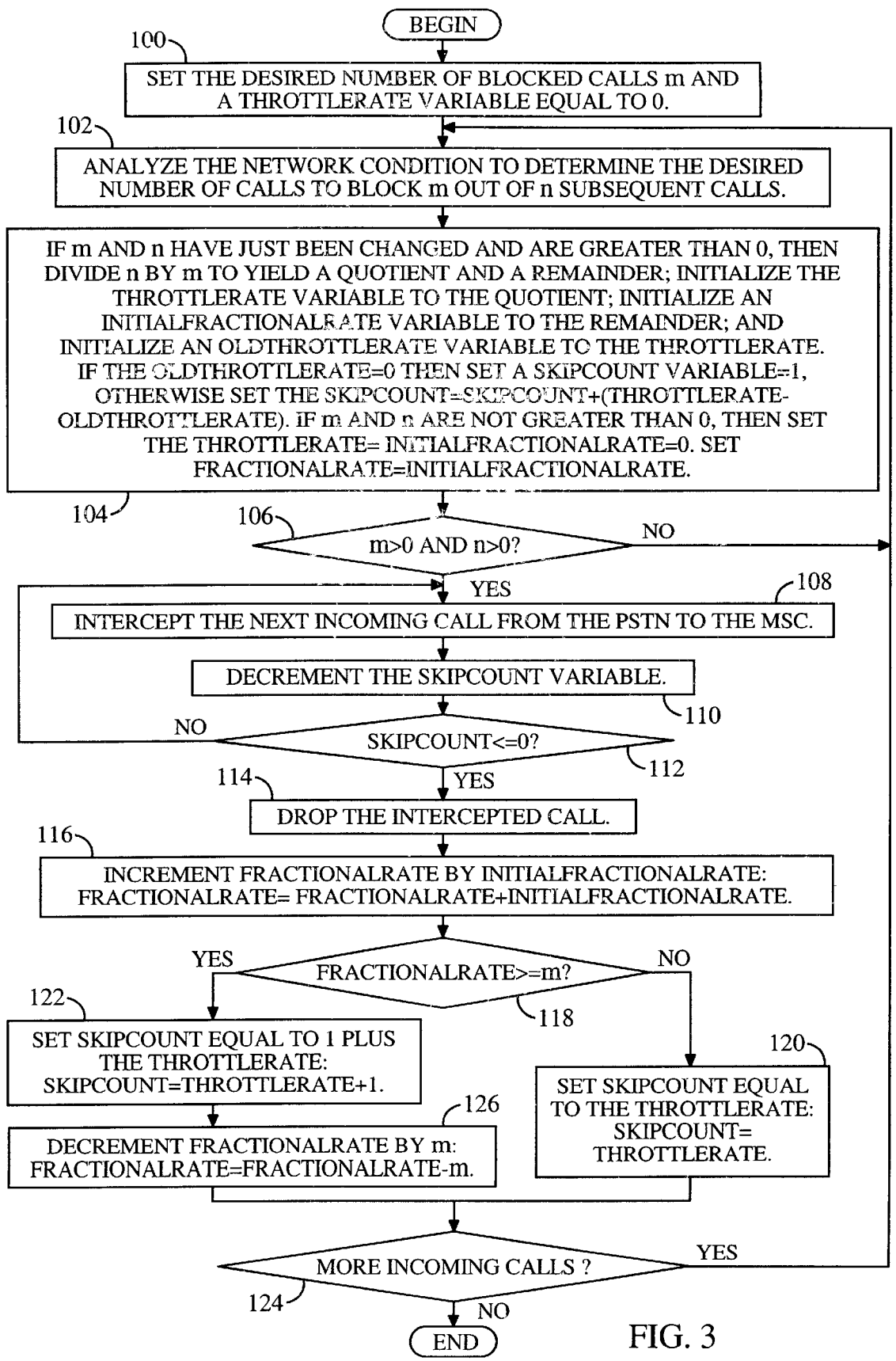
FIG. 3 is a flow diagram of software running on the network switching system (NSS) of FIG. 2 for implementing the call blocking system of FIG. 2.

FIG. 3 is a flow diagram of software 68 running on the NSS 56 of FIG. 2 for implementing the call blocking system 12 of FIG. 2. For the purposes of the present discussion, m is a positive integer (m>=0), and n is a non negative integer (n>0). m is the number of calls to throttle, i.e., drop, out of n calls. Throttle value is the fraction of calls to block.

The call blocking software 68 ensures that the m throttled calls are uniformly distributed over n consecutive calls and efficiently accounts for changing values of m and n. Initially, ThrottleRate is the approximate frequency at which the calls are throttled (n DIV m), which is the quotient resulting from the division of n by m. InitialFractionalRate is (n MOD m), which is the remainder resulting from the division of n by m. As mentioned above, the throttle value is a call blocking percentage or fraction, which is expressed as m/n, where m is a desired number of calls to block over a given number of calls n. In the present specific embodiment, n is 100, and in represents a call-blocking percentage.

Upon system startup, control is passed to a first step 100, which sets the desired number of calls to be blocked m and a ThrottleRate variable, i.e., the ThrottleRate equal to zero. Next, control is passed to a traffic-analyzing step 102.

In the traffic-analyzing step 102, the controller 58 of FIG. 2 analyzes the current network condition and determines the throttle value, which is retrieved by the traffic-analyzing step 102.

Subsequently, control is passed to an initialization step 104. The initialization step 104 determines if m and n have been changed by the traffic-analyzing step 102 since a previous execution of the initialization step 104. If m and n were changed in the previous traffic-analyzing step 102 and are both greater than zero, then the initialization step 104 divides. n by m, yielding a quotient and a remainder. A SkipCount variable (SkipCount) and ThrottleRate are both initialized to the quotient. An InitialFractionalRate variable (InitialFractionalRate) is initialized to the remainder, and a FractionalRate variable (FractionalRate) is initialized to zero. An OldThrottleRate variable (OldThrottleRate) is initialized to the ThrottleRate. If the OldThrottleRate equals zero then SkipCount is initialized to one, otherwise the SkipCount is initialized to SkipCount+(ThrottleRate−OldThrottleRate). If m and n are not greater than zero, then the ThrottleRate and the InitialFractionalRate are initialized to zero. If the ThrottleRate changes from zero to a positive value, the first incoming call (when OldThrottleRate is zero) is eventually dropped in a call-dropping step 114. Otherwise, if OldThrottleRate <>0, then SkipCount is initialized to the sum of the SkipCount and the difference between the new (ThrottleRate) and previous (OldThrottleRate) value of ThrottleRate as mentioned above.

ThrottleRate is one less than a default or base number of calls to skip before dropping a call. SkipCount is a counter variable that tracks skipped calls by counting remaining calls to skip. FractionalRate is a variable that accumulates fractional components that are stored via the InitialFractionalRate variable and is employed to adjust the SkipCount to accommodate call-blocking percentages (m) that do not evenly divide into n, i.e., 100. When m evenly divides into n, then the resulting remainder is zero, and the desired call-blocking percentage m is achieved by skipping every n/m−1 calls and blocking the subsequent call. In this case, n/m−1 corresponds to the ThrottleRate−1. After the initialization step 104, control is passed to an m and n comparison step 106.

The m and n comparison step 106 checks if both m and n are greater than zero. If both m and n are less than zero, then control is passed back to the initial network-analyzing step 102. Otherwise, if both m and n are greater than zero, control is passed to a call-intercepting step 108.

The call-intercepting step 108 intercepts the next call routed from the PSTN 14 to the GSS 16 of FIG. 1. Subsequently, in a first decrementing step 110, SkipCount is decremented and control is passed to a SkipCount-comparison step 112.

The SkipCount-comparison step 112 checks if SkipCount is less than or equal to zero. If SkipCount is greater than zero, then control is passed back to call-intercepting step 108. Otherwise, if SkipCount is less than or equal to zero, then control is passed to a call-dropping step 114.

The call-dropping step 114 drops the currently intercepted call and then passes control to an incrementing step 116. The incrementing step 116 increments FractionalRate by InitialFractionalRate and then passes control to a FractionalRate-comparison step 118.

The Fractional Rate-comparison step 118 checks if FractionalRate is greater than or equal to m. If FractionalRate is less than m, then control is passed to a first SkipCount-adjusting step 120. Otherwise, control is passed to a second SkipCount-adjusting step 122.

The first SkipCount-adjusting step 120 sets SkipCount equal to ThrottleRate and then passes control to a call-checking step 124. The second SkipCount-adjusting step 122 sets SkipCount equal to one more than ThrottleRate (SkipCount=1+ThrottleRate) and then passes control to a second decrementing step 126.

The second decrementing step 126 subtracts m from FractionalRate and then passes control to the call-checking step 124. The call-checking step 124 determines if additional incoming calls from the PSTN 14 of FIG. 1 are available to process. If additional calls are available to process, then control is passed back to the initial network-analyzing step 102. Otherwise, if no additional calls are available to process, the software 68 is complete.

Those skilled in the art will appreciate that additional features may be added to the software 68 or some aspects of the software 68 changed to meet the needs of a given application, without departing from the scope of the present invention. For example, an additional variable may be included to set establish a number of calls for the software 68 to process before exiting. In addition, another exit criteria may be implemented, such as a routine for monitoring user input, which may used to exit the software 68 or may be used alter software variables while the software 68 is running, without departing from the scope of the present invention.

The software 68 may be implemented in accordance with the following pseudo code:

```
0. Upon startup set m = ThrottleRate = 0.
1. Upon change in the value of either m or n (ThrottleValue):
Begin
    If ((m > 0) and (n > 0)), then
        Begin
            OldThrottleRate = ThrottleRate;
            ThrottleRate = n DIV m;
            InitialFractionalRate = n MOD m;
            If (OldThrottleRate == 0), then SkipCount = 1;
            Else SkipCount = SkipCount + (ThrottleRate −
                OldThrottleRate)
        End
    Else ThrottleRate = InitialFractionalRate = 0;
    FractionalRate = InitialFractionalRate;
End
2. For each incoming call:
Begin
    If ((m > 0) and (n > 0)), then
```

-continued

```
Begin
    Decrement (SkipCount);
    If (SkipCount <= 0), then
    Begin
        Drop the call;
        FractionalRate  =  Fractional Rate  +
            InitialFractionalRate;
        If (FractionalRate >= m), then
        Begin
            SkipCount = ThrottleRate + 1;
            FractionalRate = FractionalRate -
                m;
        End
        Else SkipCount = ThrottleRate;
    End
End
End.
```

As an example, if m=15 and n=100, then ThrottleRate=6, and InitialFractionalRate=10. If OldThrottleRate=0 then drop the first call. Then drop the $8^{th}$, $15^{th}$, $21^{st}$, $28^{th}$, $35^{th}$, $41_{st}$, $48^{th}$, $55^{th}$, $61^{st}$, $68^{th}$, $75^{th}$, $81^{st}$, and the $95^{th}$ calls, and so on. Hence, 15 calls out of 100 are dropped, including the first call.

If the throttle value (m/n) changes from 15/100 to 23/100, then after the $23^{rd}$ call where SkipCount=5, ThrottleRate= 100 DIV 23=4 and InitialFractionalRate=100 MOD 23=8. FractionalRate is initialized to the InitialFractionalRate, which is 8. The SkipCount is then initialized to SkipCount+ (ThrottleRate−OldThrottleRate)=5+(4−6)=3. When SkipCount=3, the $3^{rd}$ incoming call that arrives after the change in ThrottleValue is blocked or dropped.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for selectively blocking or dropping calls in a telecommunications network comprising:
   first means for monitoring usage of said telecommunications network and providing a gauging signal in response thereto when said usage exceeds a predetermined threshold;
   second means for determining a percentage of calls to block by said network in response to said gauging signal, said percentage of calls to block corresponding to a desired number of calls to block out of a certain number of calls;
   third means for automatically blocking said percentage of calls over said certain number of calls,
   wherein the third means includes means for accounting for values of said desired number of blocked calls that do not evenly divide into said certain number of calls; and
   wherein said means for accounting includes means for dividing said certain number of calls by said desired number of calls to be blocked and providing a number of calls to skip and a remainder in response thereto, sad number of calls to skip equivalent to one less than the quotient resulting from the division of said certain number of calls by said desired number of calls to be blocked.

2. The system of claim 1 wherein said third means includes means for incorporating a remainder resulting from a division of said certain number of calls by said desired number of calls.

3. The system of claim 1 wherein said certain number of calls is 100.

4. The system of claim 1 wherein said means for accounting further includes means for blocking a subsequent call after skipping said number of calls to skip.

5. The system of claim 4 wherein said means for a accounting includes means for employing said remainder to adjust said number of calls to skip so that over said certain number of calls, said number of calls to block are blocked by said means for blocking.

6. The system of claim 1 wherein said third means includes means for evenly distributing dropped calls over said certain number of calls while accounting for changing values of said percentage.

7. The system of claim 1 wherein said second means includes a controller running on a gateway switching system.

8. The system of claim 1 wherein said telecommunications network is a wireless communications network.

9. The system of claim 1 wherein said third means includes call-blocking software running on a gateway switching system, said gateway switching system receiving calls from a public switched telephone network.

10. A system for selectively blocking or dropping calls in a telecommunications network comprising:
    first means for monitoring usage of said telecommunications network and providing a gauging signal in response thereto when said usage exceeds a predetermined threshold;
    second means for determining a percentage of calls to block by said a network in response to said gauging signal, said percentage of calls to block corresponding to a desired number of calls to block out of a certain number of calls; and
    third means for automatically blocking said percentage of calls over said certain number of calls,
    wherein said third means includes means for determining a throttle rate based on said percentage of calls to block; and
    wherein said third means further includes means for initializing an initial fraction rate to the remainder of said certain number of calls divided by said throttle rate, initializing a fraction rate to zero, and initializing a skip count to one if not previously initialized or to a previous value of skip count plus a difference between said throttle rate and a previous value of said throttle rate.

11. The system of claim 10 wherein said third means further includes means for processing incoming calls to determine calls to block by said third means.

12. The system of claim 11 wherein said means for processing includes means for selectively decrementing said skip count each time a call is processed.

13. The system of claim 12 wherein said means for processing further includes means for incrementing said fraction rate by said initial fraction rate.

14. The system of claim 13 wherein said means for processing further includes means for re-initializing said skip count to said throttle rate plus 1 and setting said fraction rate to said fraction rate minus said desired number of calls to be blocked each time said fraction rate becomes larger than said desired number of blocked calls.

15. The system of claim 14 wherein said means for processing further includes means for blocking an incoming call each time said skip count becomes less than or equal to zero.

16. A system for selectively blocking or dropping a number calls over a predetermined number of calls in a telecommunications network comprising:

first means for dividing said predetermined number of calls by said number of calls to block and providing a number of calls to skip and a remainder in response thereto;

second means for blocking a subsequent call after skipping said number of calls to skip; and third means for employing said remainder to adjust said number of calls to skip so that over said predetermined number of calls, said number of calls to block are blocked by said third means.

17. The system of claim 16 wherein said number of calls to skip is one less than the quotient resulting from the division of said predetermined number of calls by said number of calls to be blocked as implemented by said second means.

* * * * *